Figure 1:
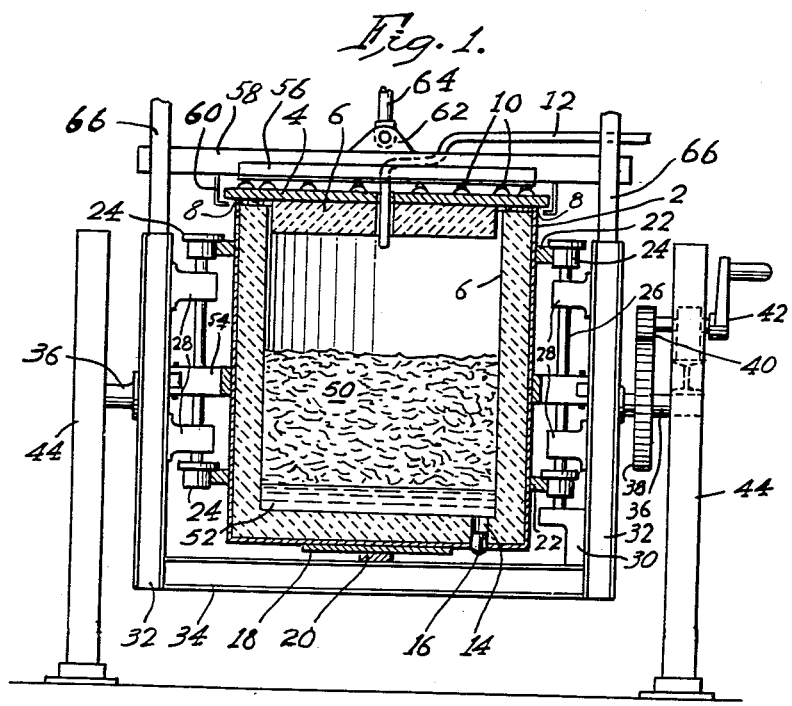

July 10, 1956

P. T. STROUP ET AL  
METHOD OF RECOVERING ALUMINOUS METAL FROM FRESHLY SKIMMED DROSS  
Filed Aug. 30, 1952

2,754,199

INVENTORS.  
Philip T Stroup and  
James D. Dowd.  
BY George B. Todd  
ATTORNEY:-

United States Patent Office 2,754,199
Patented July 10, 1956

2,754,199

METHOD OF RECOVERING ALUMINOUS METAL FROM FRESHLY SKIMMED DROSS

Philip T. Stroup and James D. Dowd, New Kensington, Pa., assignors to Aluminum Company of America, Pittsburgh, Pa., a corporation of Pennsylvania Application August 30, 1952, Serial No. 307,254

6 Claims. (Cl. 75—68)

This invention relates to the recovering of the free metal intimately intermixed with the dross and skimmings obtained from melts of aluminum and aluminum base alloys, and it is especially concerned with treating hot dross at a temperature below that at which it normally burns in air whereby higher metal recoveries are obtained than have been attained in previous commercial practice. For the sake of convenience, both the aluminum and the alloys in which this metal predominates will be designated aluminous metal.

The dross and skimmings derived from aluminous metal melts unavoidably contain a high proportion of free metal as a result of the usual stirring of the melt and raking off the floating material. If a batch of hot dross removed from a melt is allowed to stand some free metal will accumulate at the bottom of the mass, but the larger part of the free metal will remain distributed throughout the dross mass in the form of globules or small particles. Also, upon being exposed to the atmosphere the hot dross begins to react with the air, if the reaction has not already started in the furnace, and if the reaction is not stopped a large part of the available metal will be lost. The separation of the free metal from the non-metallic portion of the dross has been a difficult problem; several methods used or proposed for effecting separation are mentioned below.

In one method, the dross is cooled to room temperature as quickly as possible, crushed and screened. The coarser metal particles are retained on the screen and thus separated, but a large portion of the free metal still remains associated with the dross passing through the screen. In another process, the hot dross is stirred into a heel of molten aluminum or aluminum alloy. This process is not efficient because in agitating the dross with the molten metal heel nearly as much metal is beaten into the dross as is removed. In another process, a fused salt bath has been proposed as a substitute for a molten metal heel. This process has not proved to be efficient and is, of course, expensive because of the consumption of a large quantity of salt and the attendant expense of reclaiming it if that should be desired. Still another method has consisted of adding a certain amount of salt flux to the hot dross and working it into the mass. Some degree of coalescence of the metal particles is obtained in this manner, but its effectiveness depends upon the thoroughness of the working and it is difficult to perform because of discomfort to the operators.

A more recent and efficient process is that described and claimed in United States Patent No. 2,481,591 to Heilman and Short. According to this method, either hot or cold dross which has been reheated is placed in an inclined rotatable drum open to the air and the mass rotated therein for a short period of time. If the dross is not already burning when introduced into the drum, the ignition is started by the addition of suitable salts. Controlled burning in this manner serves to break the oxide film around the metal globules and permits their coalescence. Metal which accumulates at the bottom of the charge is drained off from time to time. In this process a portion of the finely divided free metal is consumed in reacting with the air to provide the heat essential for raising the temperature of the mass and consequently the recovery of metal is not as high as is desired. Metal recoveries on the order of 65 to 70 per cent of the available metal have been achieved by this method but on an average the recovery has been found to be below 60 per cent.

The principal object of our invention is to obtain higher metal recovery from hot dross than has been possible in the prior art practices. A particular object is to provide a method which permits treating hot dross containing liquid metal at a temperature below that at which the dross ignites or burns. Another object is to provide a method for treating hot dross immediately after it has been skimmed from a melt which permits return of the reclaimed metal to the melt. Still another object is to provide a method of treating freshly skimmed dross at lower temperatures than employed heretofore and thus reduce discomfort to the operators as well as lowering the cost of reclamation. Another object is to provide a method of recovering metallic values from hot dross which obviates the need for the addition of any salt fluxes to the dross.

Figure 2:
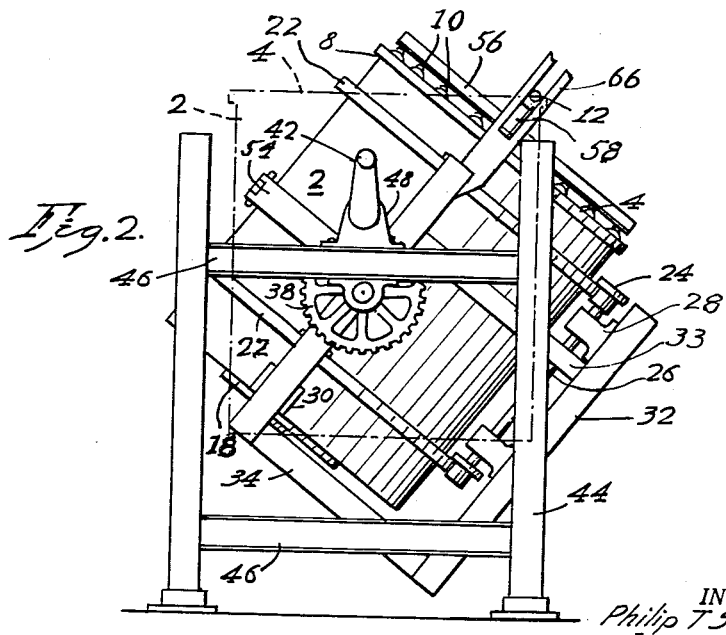

These and other objects and advantages will become apparent from the following description and accompanying drawings of apparatus suitable for carrying out the process in which Fig. 1 is a front elevation, partially in section, and Fig. 2 is a side elevation, showing the apparatus in operating position.

We have found that freshly skimmed dross can be successfully treated to reclaim a large part of the free metal content by agitating the dross in a non-oxidizing atmosphere containing aluminum chloride as the essential component, only sufficient chloride being provided or generated to establish the atmosphere, and withdrawing the liquid metal accumulating at the bottom of the dross charge. In this treatment no burning of the dross occurs, as normally takes place in contact with air, and if some burning has already started in the mass of dross before it is treated, exposure to the aluminum chloride atmosphere quickly extinguishes the reaction. As a result of avoiding reaction with an oxidizing atmosphere the temperature of the dross does not rise to as high a level as in those processes where burning or a chemical reaction is intentionally promoted. Generally, the temperature of the dross does not change greatly during period of treatment, particularly if the free metal does not contain elements which are readily converted into chlorides. However, even if the metal contains such elements as magnesium which readily react with aluminum chloride, the temperature of the mass is not greatly increased and ordinarily will not exceed 1700° F. In treating drosses obtained from melts containing little or no magnesium the temperature will not usually go above 1500° F. It is a characteristic of our process that no heat is supplied during treatment of the dross and that reliance is placed upon the temperature of the mass at the time the process is started together with any heat developed as a result of chemical reaction to maintain the dross at a sufficient temperature to prevent freezing of the metal and keep the mass in a sufficiently fluid or plastic condition for effective treatment.

The metal reclaimed from dross by our process is singularly free from oxides and other non-metallic inclusions and therefore it can be immediately returned to the melt from which the dross was obtained without contaminating the melt. Also, the temperature of the metal drained from the treated dross is low enough to minimize oxidation during subsequent handling. Further, since the reclamation process occupies but a relatively short time, it is possible to skim the melt and return the recovered metal to the furnace before the metal is tapped into molds or other receptacles.

The free metal content of the dross may vary considerably according to the melting conditions, fluxes employed and composition of the alloy. In addition, the care used in skimming a melt has a large effect upon the amount of metal raked off with the dross. Ordinarily it is not profitable to process dross which does not contain at least 30 per cent by weight of free metal. On the other hand, there is no limit on the maximum amount of free metal that may be present from the standpoint of successful operation of the reclamation process. As a matter of efficiency it has been discovered that a higher percentage recovery is actually obtained from drosses which contain more than 80 per cent of free metal. In this respect the process represents an improvement over that described in the Heilman and Short patent referred to hereinabove since the process therein described requires an initial reduction in metal content of very metal-rich drosses in order to initiate the burning reaction. In our process it may be desirable to drain any metal which collects at the bottom of a batch of dross before agitating it under the aluminum chloride atmosphere in order to reduce the bulk of the material but such a preliminary separation of any liquid metal is not imperative insofar as efficiency of the reclamation process is concerned.

The consistency or physical condition of the dross is determined in large part by its metal content. A "wet" dross contains 80 per cent or more of liquid metal whereas a "dry" dross usually contains 50 per cent or less of free metal and is plastic but not fluid in consistency. The treatment of wet dross has been especially difficult in the past not only because of its physical condition but because the oxides and other non-metallic particles are actually suspended in liquid metal. The separation of the relatively small amount of non-metallic material from the metal has not been effectively and quickly realized by any of the processes of the prior art as far as we are aware.

In some cases it has been found to be desirable to flux the melt in the furnace with a substance from the group consisting of gaseous chloride or aluminum chloride just before skimming off the dross to improve the quality of the molten metal. Such a practice serves to "dry" the floating non-metallic mass on the melt and reduce its metal content. It is sometimes more convenient to handle such a dry dross and to forego the maximum metal recovery which might otherwise be obtained. Where such fluxing is done care should be exercised to minimize or prevent any burning of the dross. From the standpoint of maximum efficiency no burning should be permitted at any stage in the melting operation and transfer of the dross to the treating chamber.

The dross should be skimmed from the melt into a suitable container or it may be directly placed in the receptacle in which it is to be treated. As mentioned above, the temperature of the dross should be high enough to maintain the metal in liquid condition but preferably below 1500° F.

The container or chamber in which the dross is to be treated should be filled not more than two-thirds full and preferably half full of the skimmed material. Such a partial filling is required if efficient agitation and exposure to the aluminum chloride atmosphere is to be achieved.

At the treating station, the container holding the charge of dross should be covered or closed to the atmosphere but not with sufficient tightness to prevent escape of a small amount of aluminum chloride vapor. It may be desirable to provide valves or vents in the cover if the seal between container and cover is air tight. The aluminum chloride atmosphere is immediately supplied to replace the air. This atmosphere may be derived from vaporizing solid chloride introduced in the dross in capsules, or the chloride may be vaporized outside of the container and conducted into the chamber by suitable tubes. If aluminum chloride capsules are employed then it is necessary to provide means for adding more capsules with the progress of the treatment in order to maintain the desired atmosphere.

A very effective way of developing the aluminum chloride atmosphere is that of introducing gaseous chlorine into the covered container at a relatively slow rate and allowing it to react with a very small portion of the aluminous metal. Only enough chlorine should be admitted to create the desired atmosphere and not enough to cause a reaction which would substantially increase the temperature of the dross and metal. We have found that this condition can be achieved by introducing chlorine at a rate of not more than 0.005 pound per minute per pound of dross being treated. At this rate, it has been found that not over approximately 0.5 to 1 per cent of the free metal and not more than 3 per cent is consumed.

Instead of using pure chlorine, it is possible to dilute the gas with certain inert gases of the group consisting of nitrogen and argon. However, the dilution should not be carried to the point where the aluminum chloride is less than about 50 per cent of the total atmosphere.

The mass of dross should be thoroughly agitated or stirred while under the aluminum chloride atmosphere. Such agitation or stirring may be very effectively accomplished by use of a cylindrical, rotatable container in an inclined position in the same manner as that described in the Heilman and Short patent. For best results the axis of the container should be inclined between 30 and 60 degrees to the horizontal. The container may be rotated for a period of not over 15 minutes and preferably for a period not exceeding 10 minutes. Instead of rotating an inclined container, the receptacle or chamber may be stationary and suitable mechanically operated paddles or blades inserted to produce the necessary agitation.

At the conclusion of the agitation, the supply of aluminum chloride or chlorine is reduced or cut off and the liquid metal which has accumulated beneath the dross mass may be withdrawn. In the majority of cases, enough free metal will remain in the dross to justify repetition of the agitation step. This may be repeated two or even three times depending upon the amount of metal found in the dross. Through repeated treatments, it has been possible to obtain recoveries of as much as 90% of the total available metal. However, an average recovery of about 70% of the free metal has been obtained in treating a large number of dross charges derived from a great variety of alloys and aluminum of varying purity.

After the last metal has been withdrawn, the residue in the container may be discharged into a suitable receptacle for disposal.

Our process is adapted to the treatment of dross derived from aluminum and all aluminum base alloys. However, in the case of alloys containing elements which readily react with chlorine, such as magnesium, it will be found that there is a loss of such elements. These losses are of little importance so far as the value of the reclaimed metal is concerned.

Practice of our invention may be better understood by reference to the accompanying figures which illustrate, somewhat diagrammatically, a suitable form of apparatus for the treatment of dross.

A cylindrical container 2 with a cover 4 lined with a refractory material 6 is employed to hold a charge of dross 50 and pool of molten metal 52 underneath the dross. A tap hole 14 in the bottom of the container permits drainage of the liquid metal therefrom. A plug 16 of a suitable plastic nature, such as "doughball," which hardens upon being heated, fills the tap hole. The container 2 rests on a turntable 18 supported on a suitable bearing 20 which in turn is mounted on the base 34 of a tilting cradle. Attached to the exterior of the container are a pair of tracks 22 for engaging three sets of rollers 24 on the cradle frame. Each set of rollers is mounted on a shaft 26 supported in bearing blocks 28. One set of the rollers is driven by a motor and speed reducer unit 30, said driven rollers being used to rotate the container when in an inclined position. The two sets of rollers appearing in Fig. 1 are not disposed at 180° to each other but are at a smaller angle of 160 to 170° to permit easy placement and withdrawal of the container from the cradle. The third set of rollers is provided at the rear of the cradle as seen in Fig. 2 to support the container when tilted in operating condition. Less slippage between the rollers and track is obtained if the rollers at the rear are driven rather than those at the side.

The tilting cradle is composed of vertical frame members 32 with suitable cross members 33 and the base 34, the vertical members carrying extensions 66 that serve as guides for a crosshead member 58. The cradle, which is supported on trunnions 36, is tilted by means of crank 42, operating in bracket 48, pinion 40 and ring gear 38. A motor drive may, of course, be substituted for the manually operated crank. The whole cradle assembly is carried by the main frame anchored to the floor and composed of column members 44 and the cross members 46.

The cover 4 is provided with a number of ball bearing units spaced at intervals close to the edge which bear against circular pressure plate 56 when the container is sealed. The pressure plate, which is attached to crosshead 58, carries four flanged lugs 60 that engage the cover when it is to be raised or lowered. The crosshead is connected to a piston rod 64 through yoke 62, and the assembly raised or lowered by an air cylinder, not shown. The cover is sealed to the container by a suitable packing material 8, such as asbestos rope. A tube 12 for supplying chlorine enters the container through a hole provided in the center of the cover. By means of the foregoing arrangement the cover can be pressed against the top edge of the container and can still rotate therewith. The packing 8 should not be dense enough nor be compressed sufficiently to prevent escape of aluminum chloride vapor.

In operation the container is pre-heated, if it has not been already heated through treatment of a previous batch of dross, and placed at the skim door of the melting furnace to receive the dry dross raked from the metal. Only enough dross should be placed in the container to fill it to not more than two-thirds of its capacity, and preferably only half of it, in order to assure efficient treatment. A convenient size of container for this purpose is one which will permit the treatment of 300 to 900 pounds of dross. The container with dross is immediately transported to the treating station, by any suitable vehicle, such as a forked truck, the time for transfer being as short as possible to avoid initiating any burning of the dross or freezing of the metal. At the treating station, the container is hoisted to the elevation of the turntable in the cradle and placed thereon in a vertical position as shown in Fig. 1 and by the dotted outline in Fig. 2.

Upon placement of the container in the cradle the clamping band 54 is fastened in position to prevent unseating of the container during any tilting of the cradle. The cover 4 is lowered to rest on the asbestos rope seal 8 and the flow of chlorine is commenced. The flow should be controlled so that some fumes of aluminum chloride will escape and thus maintain a positive pressure within the container. To avoid contamination of the atmosphere, it is desirable to conduct the dross treatment in a ventilated room or under a hood. The normal ventilation employed in a melting room is generally sufficient to dispose of the small amount of aluminum chloride fumes.

After the flow of chlorine has started the cradle and container are tilted at an angle of about 45° to the horizontal and rotation is started. The speed of rotation may be varied from about one to twenty R. P. M. and should be continued for a period of not more than 15 minutes. In the presence of the aluminum chloride atmosphere and the absence of air no burning occurs in the dross and any which may have started is quickly quenched.

At the conclusion of the period of rotation the gas supply is reduced or cut off and the liquid metal is drained through tap hole 14 into a mold or other suitable receptacle placed below the container. Ordinarily, however, more metal can be recovered from the dross by repeating the treatment. In that case the tap hole is again plugged and the container rotated for the desired length of time.

After the last metal has been drained from the container the cover is raised to its uppermost position and the cradle and container tilted further to a downward position such that the dross residue either flows out or can be easily scraped from the container. A suitable refractory lined bin or receptacle should be provided to receive the hot dross residue. The container is then returned to its vertical position and can then be removed from the cradle to receive another batch of dross.

It is to be understood that the use of a portable container is optional as far as conducting the treatment of the dross is concerned. It is entirely feasible to convey the dross from the furnace to this treating station in another receptacle and to transfer the charge to the rotatable container at the treating station.

Having thus described our invention, we claim:

1. The method of treating hot aluminous dross containing liquid aluminous metal to recover the metal in liquid form comprising skimming the dross from an aluminous metal melt, transferring the dross without substantial drop in temperature to a confined space, providing a non-oxidizing atmosphere in said space containing aluminum chloride as the principal component, agitating said dross under said atmosphere, halting the agitation and withdrawing the accumulated liquid metal.

2. The method of treating hot aluminous dross containing liquid aluminous metal to recover the metal in liquid form comprising skimming the dross from an aluminous metal melt, transferring the dross without substantial drop in temperature to a confined space, providing a non-oxidizing atmosphere in said confined space by introducing gaseous chlorine into said confined space only in sufficient amount to completely react with said aluminous metal in the dross and produce aluminum chloride, agitating said dross under said atmosphere, halting the agitation and withdrawing the accumulated liquid metal.

3. The method of treating hot aluminous dross containing liquid aluminous metal to recover the metal in liquid form comprising skimming the dross from an aluminous metal melt, transferring the dross without substantial drop in temperature to a confined space, providing a non-oxidizing atmosphere in said space by introducing gaseous chlorine at a rate of not more than 0.005 pound per minute per pound of dross whereby all of the chlorine reacts with the aluminous metal to form aluminum chloride, agitating said dross under said atmosphere, halting the agitation and withdrawing the accumulated liquid metal.

4. The method of treating hot aluminous dross containing liquid aluminous metal to recover the metal in liquid form comprising skimming the dross from an aluminous metal melt, transferring the dross without substantial drop in temperature into a covered rotatable container, providing a non-oxidizing atmosphere in said covered container containing aluminum chloride as the principal component, rotating said container on an inclined axis for a period of not over fifteen minutes, halting the rotation and withdrawing the accumulated liquid metal.

5. The method of treating hot aluminous dross containing liquid aluminous metal to recover the metal in liquid form comprising skimming the dross from an aluminous metal melt, transferring the dross without substantial drop in temperature to a confined space, providing a non-oxidizing atmosphere in said space composed of aluminum chloride as the principal component and at least one inert gas of the group consiting of argon and nitrogen, agitating said dross under said atmosphere for a sufficient period of time to allow liquid metal to accumulate at the bottom of the dross charge, halting the agitation and withdrawing the accumulated liquid metal.

6. The method of treating hot aluminous dross containing liquid aluminous metal to recover the metal in liquid form comprising skimming the dross from an aluminous metal melt, transferring the dross without substantial drop in temperature to a confined space, the temperature of said dross not exceeding 1500° F., providing a non-oxidizing atmosphere in said space containing aluminum chloride as the principal component, agitating said dross under said atmosphere for a period of not more than fifteen minutes while maintaining the temperature of the dross below 1700° F., halting the agitation and withdrawing the accumulated liquid metal.

References Cited in the file of this patent

UNITED STATES PATENTS

| | | |
|---|---|---|
| 1,729,631 | Stay | Oct. 1, 1929 |
| 1,743,515 | Anderson | Jan. 14, 1930 |
| 2,481,591 | Heilman et al. | Sept. 13, 1949 |